United States Patent
Iwata (10) Patent No.: US 8,031,563 B2
(45) Date of Patent: Oct. 4, 2011

(54) LIBRARY SYSTEM, DATA STORAGE MEDIUM TRANSPORTATION MECHANISM, METHOD OF INITIALIZING A DATA STORAGE MEDIUM TRANSPORTATION MECHANISM, METHOD OF TRANSPORTING A DATA STORAGE MEDIUM, SIGNAL-BEARING MEDIUM EMBODYING A PROGRAM OF INITIALIZING, AND SIGNAL-BEARING MEDIUM EMBODYING A PROGRAM OF TRANSPORTING

(75) Inventor: Shinichi Iwata, Tokyo (JP)

(73) Assignee: NEC Corporation, Tokyo (JP)

( * ) Notice: Subject to any disclaimer, the term of this patent is extended or adjusted under 35 U.S.C. 154(b) by 1127 days.

(21) Appl. No.: 11/258,155

(22) Filed: Oct. 26, 2005

(65) Prior Publication Data

US 2006/0092551 A1 May 4, 2006

(30) Foreign Application Priority Data

Oct. 28, 2004 (JP) ................................. 2004-313864

(51) Int. Cl.
*G11B 17/04* (2006.01)
*G11B 21/08* (2006.01)
*G11B 7/085* (2006.01)

(52) U.S. Cl. ............... 369/30.39; 360/99.07; 369/30.43; 369/30.45

(58) Field of Classification Search .... 360/98.04–99.03; 369/30.38–31.01
See application file for complete search history.

(56) References Cited

U.S. PATENT DOCUMENTS

| 4,817,070 | A | * | 3/1989 | Hug et al. ................... 369/30.39 |
| 5,703,843 | A | * | 12/1997 | Katsuyama et al. ........ 369/30.33 |
| 5,760,995 | A | * | 6/1998 | Heller et al. ................. 360/92.1 |
| 5,870,245 | A | * | 2/1999 | Kersey et al. ................ 360/92.1 |
| 5,940,355 | A | * | 8/1999 | Buckland et al. .......... 369/30.55 |
| 6,094,322 | A |   | 7/2000 | Nakagomi et al. |
| 6,751,040 | B2 | * | 6/2004 | Gupta et al. .................... 360/69 |
| 7,133,247 | B1 | * | 11/2006 | Manes et al. ................. 360/92.1 |
| 2002/0057514 | A1 | * | 5/2002 | Patterson et al. ............... 360/69 |
| 2006/0146439 | A1 | * | 7/2006 | McIntosh et al. ............... 360/92 |

FOREIGN PATENT DOCUMENTS

JP 2004-30750 1/2004

OTHER PUBLICATIONS

German Office Action dated Jun. 29, 2009, with English translation.

* cited by examiner

*Primary Examiner* — Daniell L Negron
*Assistant Examiner* — Adam B Dravininkas
(74) *Attorney, Agent, or Firm* — McGinn IP Law Group, PLLC (57) ABSTRACT

A library system includes a first library device that includes a first-drive for reading information from or writing information to a data storage medium and a first storage cell for storing the data storage medium, a second library device that includes a second drive for reading information from or writing information to the data storage medium and a second storage cell for storing the data storage medium, the second library device being positioned adjacent the first library device, and an elevator that transports the data storage medium between the first library device and the second library device, the elevator being positioned between the first library device and the second library device.

6 Claims, 9 Drawing Sheets

LIBRARY SYSTEM, DATA STORAGE MEDIUM TRANSPORTATION MECHANISM, METHOD OF INITIALIZING A DATA STORAGE MEDIUM TRANSPORTATION MECHANISM, METHOD OF TRANSPORTING A DATA STORAGE MEDIUM, SIGNAL-BEARING MEDIUM EMBODYING A PROGRAM OF INITIALIZING, AND SIGNAL-BEARING MEDIUM EMBODYING A PROGRAM OF TRANSPORTING

BACKGROUND OF THE INVENTION

The present invention relates to a library system which stores a plurality of data cartridges, such as a magnetic tape, magnetic disk, optical disk and magneto-optical disk, selectively takes up a desired data cartridge from these data cartridges, and can perform a data storage medium (i.e., data cartridge) transfer between a library device which performs data reading/writing and a library device stacked in layers in this library system by use of an internal drive unit.

A conventional library system which stores data cartridges in multiple cells of a magazine, selectively takes up a desired data cartridge from these data cartridges, and performs data reading/writing by use of a drive unit (which may be called a data storage system).

When a data cartridge within such a conventional library device is to be moved to another library device of the same configuration, such movement has been manually carried out.

Thus, manpower has been dedicated to a library device for a time or at given time intervals, and this has required labor costs. Furthermore, it has been necessary to stop a library device when a user takes out cartridges from the library system or loads them into the library device, and thus the efficiency of the library system decreases.

Also, in the case of a library system in which library devices are merely stacked in layers, there has been no mechanism for data cartridges to move between the library devices. Thus, even when a library device has an empty drive, a data cartridge housed in another drive unit cannot use the empty drive, and thus the working rate of the whole library system is low.

Therefore, a library device has been proposed in which an area in which an elevator ascends and descends is newly provided in the space of a magazine and a drive unit is arranged along a transfer area of a cartridge access device. When this library device is vertically stacked in multiple layers, elevator areas of the library devices stacked in layers become connected to each another in a line, thereby allowing each data cartridge to move between libraries above and below the data cartridge, and making it possible to solve various problems as described above.

SUMMARY OF THE INVENTION

However, in such a proposed library, part of the space for the magazine and drive unit in each library device is occupied as an area for the passage of an elevator, and thus the number of cartridges is limited. Furthermore, when an area exclusively for an elevator is additionally provided in a library device afterward, the size of the library device itself becomes large.

Therefore, in view of the above-described exemplary problems and others in conventional techniques, the present invention exemplarily provides a cartridge transfer mechanism which permits the movement of data storage medium (i.e., data cartridges) between library devices without increasing the size of the library system, and a library system provided with this cartridge transfer mechanism.

The present invention provides a library system which includes a first library device that includes a first drive for reading information from or writing information to a data storage medium and a first storage cell for storing the data storage medium, a second library device that includes a second drive for reading information from or writing information to the data storage medium and a second storage cell for storing the data storage medium, the second library device being positioned adjacent the first library device, and an elevator that transports the data storage medium between the first library device and the second library device, the elevator being positioned between the first library device and the second library device.

An area of the elevator in a top view may be within an area of the first library device or the second library device.

The first library device may further include an accessor that transports the data storage medium between the first drive and the first storage cell.

An area of movement of the accessor and the elevator may overlap.

The elevator may be devoid of a stationary structure in the overlapped area.

The elevator may further include an elevator cell that stores the data storage medium, the elevator cell being movable between the first library device and the second library device.

The elevator cell may deliver or receive the data storage medium from the accessor.

The elevator may further include an arm that is provided with the elevator cell, the arm rotating about an axis, and a supporting plate that includes the axis.

The elevator may further include a second arm that is provided with the elevator cell, the second arm slides along and rotates about an elongated hole provided with the supporting plate.

The elevator may further include a first gear that is fixed to the first arm and rotatably fixed to the elevator cell, and a second gear that is fixed to the second arm and rotatably fixed to the elevator cell.

The elevator may further include a position sensor that detects whether the elevator cell is positioned above or below the axis.

The position sensor may include an optical sensor that includes a light emitting part and a light receiving part; and a position sensor flag that is partially notched and journalled to the axis, the position sensor flag passing between the light emitting part and the light receiving part. When a light from the light emitting part of the position sensor to the light receiving part is not shut out by the position sensor flag, it may be judged that a position of the elevator cell is positioned above the axis, and when the light from the light emitting part of the position sensor to the light receiving part is shut out by the position sensor flag, it may be judged that a position of the elevator cell is positioned below the axis.

The elevator may further include an origin sensor that detects whether the arm is in a substantially horizontal position.

The origin sensor may include a second optical sensor that includes a second light emitting part and a second light receiving part, and an origin sensor flag that includes a plate perpendicularly fixed to a side surface of the arm, the origin sensor flag passing between the second light emitting part and the second light receiving part. When a light from the light emitting part of the second position sensor to the second light receiving part is not shut out by the origin sensor flag, it may be judged that the arm is inclined. When a light from the light emitting part of the second position sensor to the second light receiving part is shut out by the origin sensor flag, it may be judged that the arm is in a substantially horizontal position.

The present invention also provides a data storage medium transportation mechanism which includes an elevator that transports the data storage between a first library device and a second library device, the elevator being positioned between the first storage and second storage. The first library device includes a first drive for reading information from or writing information to a data storage medium and a first storage cell for storing the data storage medium, and the second library device includes a second drive for reading information from or writing information to the data storage medium and the second storage cell for storing the data storage medium, the first library device being positioned adjacent the second library device.

The present invention also provides a method of initializing a data storage medium transportation mechanism. The method includes providing an elevator that transports a data storage between a first library device and a second library device, the elevator being positioned between the first library device and second library device, providing an arm that is provided with an elevator cell, the arm rotating about an axis, providing origin sensor that becomes closed when the arm is in a substantially horizontal position, judging whether the origin sensor is closed at first, when the origin sensor is judged to be closed, moving the arm upwardly, judging whether the origin sensor is open, when the origin sensor is judged to be open, moving the arm upwardly by a predetermined number of pulses, moving the am downwardly, judging whether the origin sensor changes over to closed, and when the origin sensor is judged to be changed over to closed, moving the arm downwardly by a predetermined number of pulses.

The method of initializing a data storage medium transportation mechanism may further include providing a position sensor that becomes open when the elevator cell is positioned below the axis, when the origin sensor is not closed at first, judging whether the position sensor is closed subsequently, when the position sensor is judged to be closed, moving the arm upwardly, judging whether the origin sensor changes over to closed, and when the origin sensor is judged to be changed over to closed, moving the arm upwardly by a predetermined number of pulses.

The method of initializing a data storage medium transportation mechanism may further include when the position sensor is judged to be open, moving the arm downwardly, judging whether the origin sensor changes over to closed, and when the origin sensor is judged to be changed over to closed, moving the arm downwardly by a predetermined number of pulses.

The present invention also provides a method of transporting a data storage medium which includes providing an elevator that transports a data storage medium between a first library device and a second library device, the elevator being located between the first library device and second library device, providing an arm that is provided with an elevator cell, the arm rotating about an axis, providing an origin sensor that becomes closed when the arm is in a substantially horizontal position, providing a first accessor that transports the data storage medium in the first library device, providing a second accessor that transports the data storage medium in the second library device, providing a motor that moves the arm by a pulse count, providing a storage medium sensor that becomes closed when the data storage medium is stored in the elevator cell, after initializing the arm position, moving the elevator cell downwardly, judging whether the origin sensor changes over to open, when the origin sensor is judged to be changed over to open, resetting the pulse count, moving the elevator cell downwardly by a predetermined number of pulses, moving the data storage medium from the second accessor to the elevator cell, judging whether the storage medium sensor is closed, when the storage medium sensor is judged to be closed, moving the elevator cell upwardly, judging whether the origin sensor changes over to open, when the origin sensor is judged to be changed over to open, resetting the pulse count, moving the elevator cell upwardly by a predetermined number of pulses, moving the data storage medium from the elevator cell to the second accessor, and judging whether the storage medium sensor is open.

The present invention also provides a signal-bearing medium embodying a program of machine-readable instructions executable by a digital processing apparatus, the program causing a data storage medium transportation mechanism to perform a method of initializing a data storage medium transportation mechanism.

The present invention also provides a signal-bearing medium embodying a program of machine-readable instructions executable by a digital processing apparatus, the program causing a data storage medium transportation mechanism to perform a method of transporting a data storage medium.

The present invention also provides a library system which includes first means including a means for reading information from or writing information to a data storage medium and a means for storing the data storage medium, second means including a means for reading information from or writing information to the data storage medium and a means for storing the data storage medium, the second means being positioned adjacent the first means, and means for transporting the data storage medium between the first means and the second means, means for transporting being positioned between the first means and the second means.

As described above, according to the present invention, the data cartridge can be transferred between the library devices without increasing the size of the library system. Also, simply by disposing the elevator (i.e., the cartridge transfer mechanism) between the library devices, the library devices can be easily expanded.

For example, the elevator can be disposed without increasing the area of the library devices in a top view. For example, this may occur because the elevator is positioned between the first library device and the second library device. As another example, this may occur because an area of movement of an accessor and the elevator cell may overlap in the present invention.

In another exemplary aspect, an area of movement of an accessor and the elevator cell can overlap. For example, this may be because the elevator may include no stationary structure in the overlapped area and/or the elevator cell that stores data storage medium (i.e., data cartridge) may move between the first library device and the second library device.

BRIEF DESCRIPTION OF THE DRAWINGS

The novel and exemplary features believed characteristic of the invention are set forth in the appended claims. The invention itself, however, as well as other exemplary features and advantages thereof, will be best understood by reference to the detailed description which follows, read in conjunction with the accompanying drawings, wherein:

FIGS. 4A1-4B2 are exemplary schematic diagrams showing the positional relationship between a position sensor and a position sensor flag, which are shown in FIGS. 2A and 2B;

FIGS. 5A1-5B2 are exemplary schematic diagrams showing the positional relationship between an origin sensor and an origin sensor flag, which are shown in FIGS. 2A and 2B;

DETAILED DESCRIPTION OF THE EXEMPLARY EMBODIMENTS

An exemplary embodiment of the present invention will be described by referring to the drawings.

Figure 1:
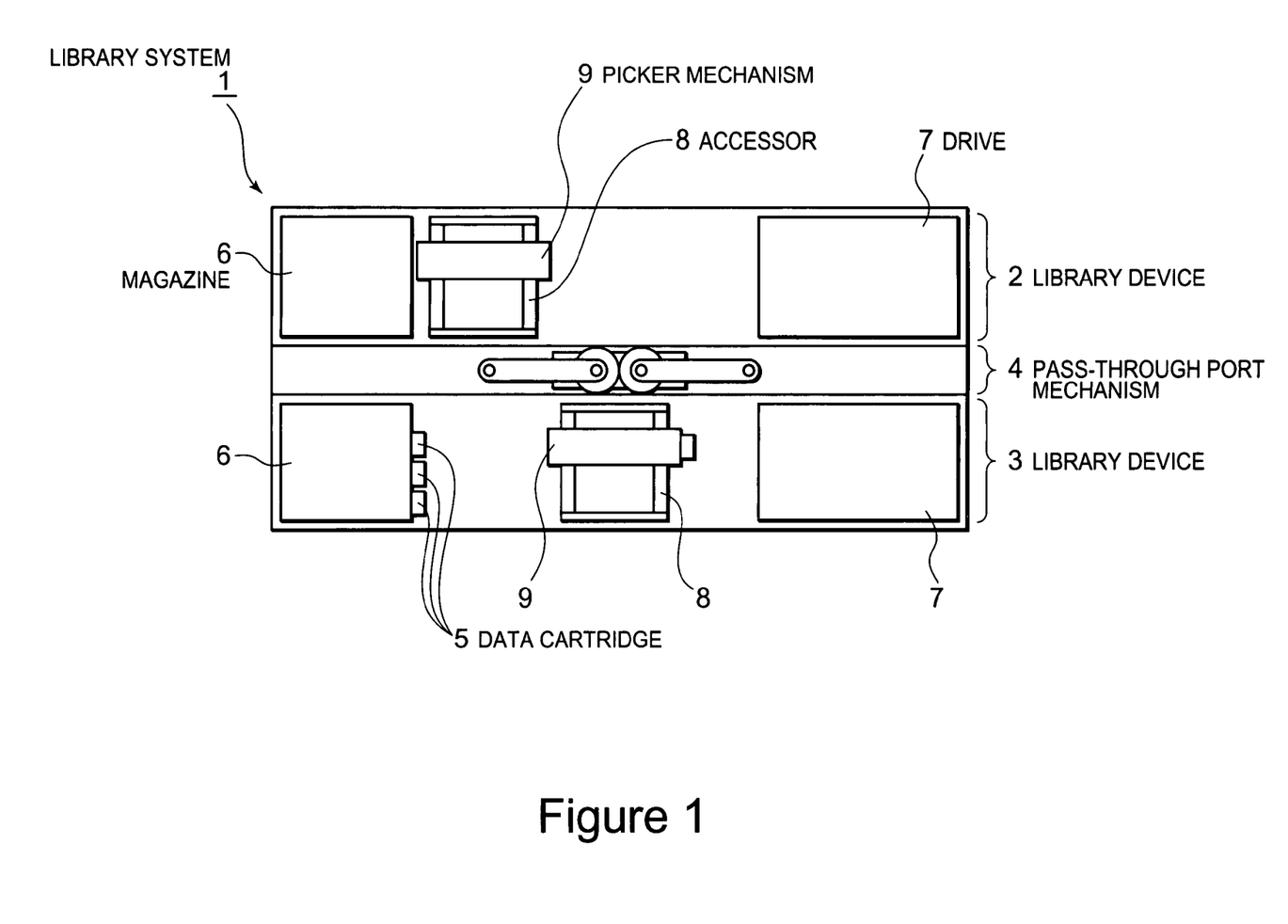
FIG. 1 shows a side view showing a general construction of a library system 1 in one exemplary embodiment of the present invention.

FIG. 1 is an exemplary side view showing a general construction of a library system 1 in one exemplary embodiment of the present invention.

As shown in FIG. 1, in library system 1 of this exemplary embodiment, two library devices 2, 3 are positioned adjacent (i.e., vertically laid, superposed) each other. An elevator (i.e., pass-through port mechanism 4) is removably disposed between the library devices. The elevator is disposed without increasing the area of library devices 2, 3 in a top view. The area of the elevator (i.e., pass-through port mechanism 4) in the top view is within an area of library device 2 or second library device 3. The elevator (i.e., pass-through port mechanism 4) may be a cartridge transfer mechanism which moves a cell capable of housing a data storage medium (i.e., data cartridge 5) to either of the upper and lower library devices 2, 3 at an appropriate time, and ensures that the data storage medium (i.e., data cartridge 5) can move between the upper library device 2 and the lower library device 3. In this exemplary embodiment the library system 1 is constituted by library devices in two stages. However, a library system can be adopted in which three or more library devices are stacked in layers and the elevator (i.e., pass-through port mechanism 4) is disposed each between two library devices.

The data storage medium (i.e., data cartridge 5) incorporates a record medium which records data shared by a computer (not shown) which is connected to library devices via a communication line, such as a LAN (local area network) and the Internet, for example. Such record medium is, for example, a tape medium, such as an LTO (Linear Tape Open) and a DLT (Digital Linear Tape), a DVD (Digital Versatile Disc) and a magneto-optical (MO) disk, which are housed in a housing, a disk medium such as an MD (Mini Disc), etc.

Each of library devices 2, 3 has a magazine 6 having multiple cells which house the data cartridges 5 stacked in a horizontal condition, drive 7 which performs the reading/writing of data from/to the storage medium within data cartridge 5, and accessor 8 which performs the transfer of data cartridge 5.

Magazine 6 and drive 7 are provided so as to enclose a prescribed space in the horizontal direction, and accessor 8 is horizontally movably disposed within this space.

Accessor 8 has a lift mechanism (not shown) which vertically lifts and lowers picker mechanism 9 which performs the loading and unloading of data cartridge 5 to and from each cell of magazine 6 or drive 7.

In each of library devices 2, 3, when the reading/writing of data from/to a desired data cartridge 5 is performed, accessor 8 moves to the magazine 6 side, and the lift mechanism causes picker mechanism 9 to be opposed to a target cell of magazine 6, whereby the desired data cartridge 5 stored in this cell is taken out and held by picker mechanism 9.

Subsequently, the accessor moves to the drive 7 side and the held data cartridge 5 is loaded by picker mechanism 9 into drive 7. As a result, the reading/writing of data from/to the desired data cartridge 5 is completed.

As described above, a space in which accessor 8 can move in the horizontal direction with respect to magazine 6 and drive 7 is formed (this space is hereinafter referred to as the "access space"), and the pass-through mechanism 4 moves a cell capable of housing cartridge 5 into this access space. For example, an area of movement of accessor 8 and the cell can overlap at the access space. This is because pass-through port mechanism 4 is provided with no stationary structure in the overlapped area, and the cell that stores a data storage medium (i.e., data cartridge) can move between library device 2 and library device 3 without collision with accessor 8.

Figure 2A:
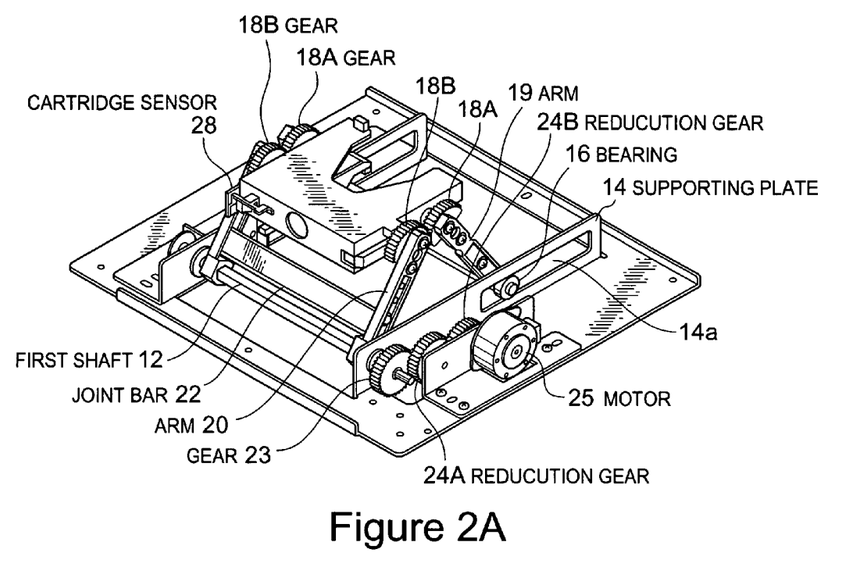
FIGS. 2A and 2B are an exemplary perspective views showing a detailed construction of a pass-through port mechanism 4.
Figure 2B:
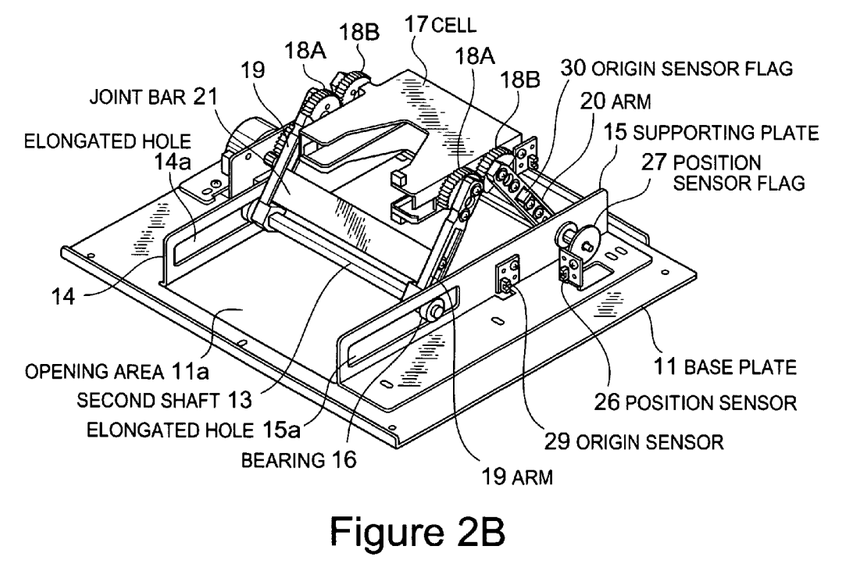

FIGS. 2A-2B show an exemplary detailed construction of the pass-through port 4 shown in FIG. 1, FIG. 2A being a perspective view as viewed from a side opposite to the data cartridge storing port side of a cell and FIG. 2B being a perspective view as viewed from the data cartridge storing port side of a cell.

The pass-through port 4 has base plate 11 fixed between the upper and lower library devices 2, 3. On base plate 11, supporting plates 14, 15 stand which respectively support both ends of two substantially parallel shafts 12, 13. Furthermore, an opening area 11a is formed in the portion between the two supporting plates 14, 15 of base plate 11. First shaft 12 is rotatably supported on a shaft in the two supporting plates 14, 15. Second shaft 13 is adapted to slide along and rotate about elongated holes 14a, 15a horizontally formed in each of supporting plates 14, 15. Bearing 16 is attached to both end portions of this second shaft 13, thereby to facilitate the sliding of second shaft 13.

In a position corresponding to the opening area 11a between the two supporting plates 14, 15, there is an elevator cell (i.e., cell 17) which stores data cartridge 5 from the horizontal direction. Cell 17 delivers or receives data storage medium (i.e., data cartridge) from accessor 8. Cell 17 is provided with cartridge sensor 28 which detects that cartridge 5 has been stored (i.e., cartridge sensor 28 becomes closed when cartridge 5 is stored in cell 17).

On each of the two side surfaces of cell 17 in a direction orthogonal to the cartridge storing direction, two gears 18A, 18B which mesh with each other are rotatably supported on a shaft. One end portion of a straight arm 19 is supported on gear 18A, and one end portion of a straight arm 20 is supported on gear 18B. As a result, arms 19, 20 are adapted to oscillate in synchronization with the rotation of their corresponding gears 18A, 18B. The other end portion of arms 19 is fixed to second shaft 13. Arm 19 is slidable horizontally and rotatable. The other end portion of arms 20 is fixed to first shaft 12, which can rotate about an axis (i.e., shaft 12 is rotatably supported on a supporting plate 14 and 15). The arms 19 are integrally connected by joint bar 21 and arms 20 are integrally connected by joint bar 22.

Gear 23 is provided at one end of first shaft 12 and this gear 23 meshes with an output gear of a motor 25, which is fixed on base plate 11, via reduction gears 24A, 24B.

Now, the operation of cell 17 will be described.

Figure 3A:
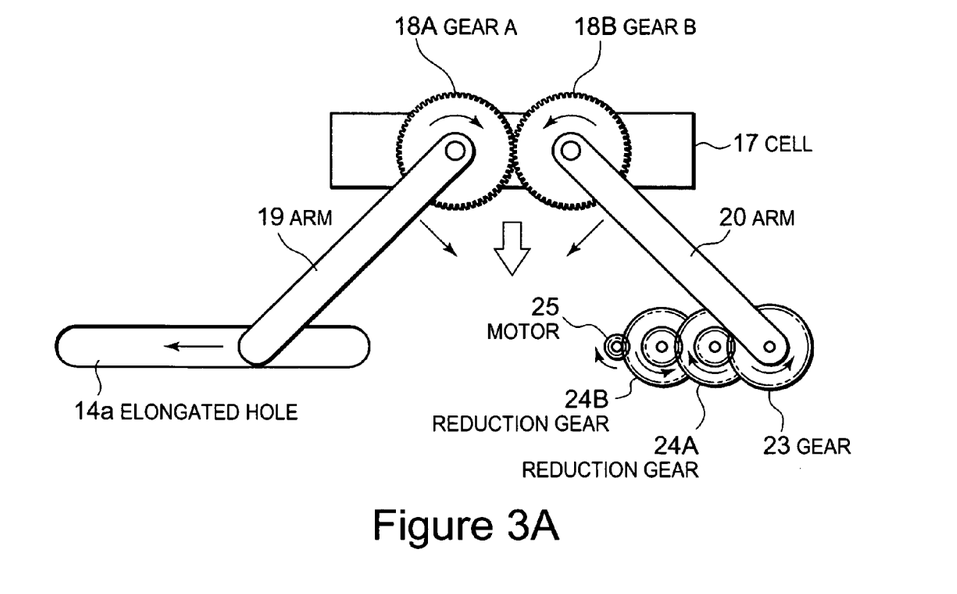
FIGS. 3A and 3B are an exemplary schematic diagrams showing the rotary direction of a motor and the moving direction of a cell, both the motor and the cell being shown in FIGS. 2A and 2B.
Figure 3B:
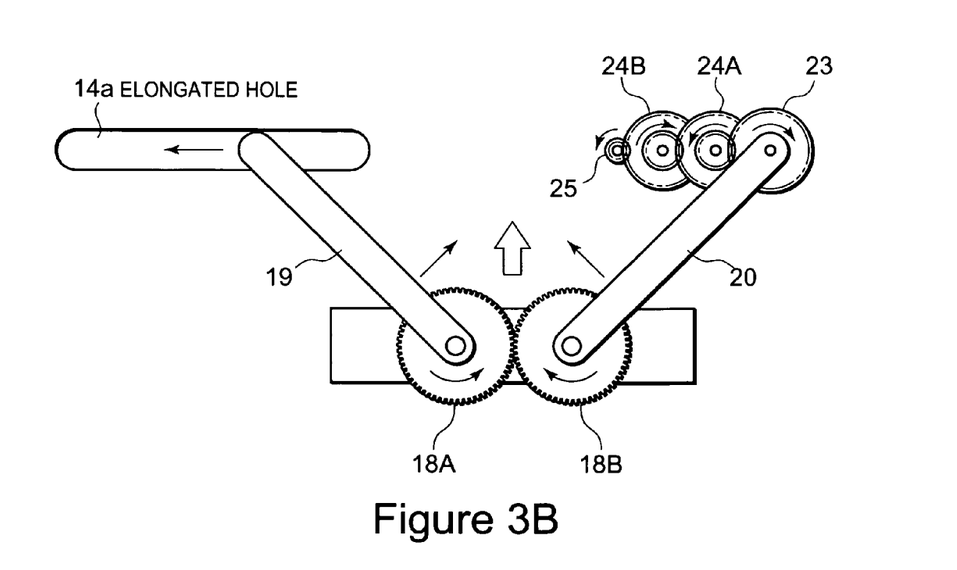

FIGS. 3A-3B show the exemplary rotary direction of motor 25 and the moving direction of cell 17. When motor 25 is rotated clockwise (CW) corresponding to a number of pulses, with cell 17 positioned on the upper side of the base plate 1, the rotational force of motor 25 is transmitted to first shaft 12 via reduction gears 24B, 25A, and gear 23 in this order. As a result, arms 20, fixed to first shaft 12, rotate downwardly. Gear 18B, fixed to arms 20, rotates gear 18A fixed to arms 19. The end portion of arms 19 on the side opposite to gear 18A is fixed to second shaft 13, and the construction is such that second shaft 13 moves only horizontally due to the elongated holes 14a, 15a provided in supporting plates 14, 15. Thus, arms 19 rotate downwardly symmetrically with respect to arms 20. As a result, cell 17 descends in a horizontal posture.

On the other hand, when motor 25 is rotated counterclockwise (CCW), with cell 17 positioned on the lower side of the base plate 1, each gear rotates as shown in FIG. 3B and cell 17 ascends constantly in a horizontal posture.

Next, the means for detecting the position of cell 17 will be described.

Figure 4A:
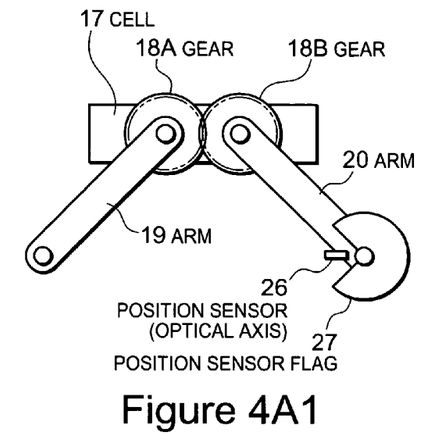

As shown in FIGS. 2A-2B, position sensor 26 which detects the position of cell 17 (i.e., whether cell 17 is positioned above or below the axis of shaft 12 (i.e., shaft 12 is rotatably supported on a supporting plate 14 and 15)) is attached to base plate 11, and position sensor flag 27 monitored by position sensor 26 is attached to the other end of shaft 12. The exemplary positional relation between position sensor 26 and position sensor flag 27 is shown in FIGS. 4A1-4B2. FIG. 4A1 is an exemplary side view when position sensor 26 is open, FIG. 4A2 is an exemplary partial perspective view when position sensor 26 is open, FIG. 4B1 is an exemplary side view when position sensor 26 is closed, and FIG. 4B2 is a partial perspective view when position sensor 26 is closed.

Figure 4A:
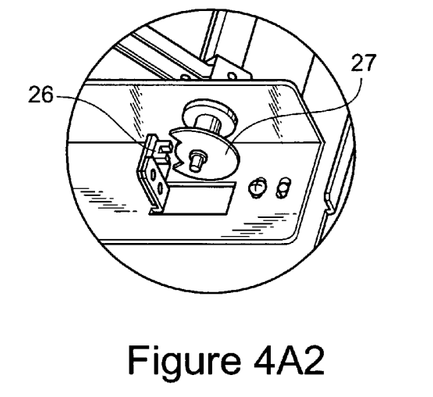

Position sensor 26 may be an optical sensor including a light emitting part and a light receiving part, which are opposed to each other, and position sensor flag 27 may be a disk journalled to the shaft 20 partially notched in a fan shape. As shown in FIGS. 4A1 and 4 A2, when the cell 7 is positioned above the axis of shaft 12, the optical axis of position sensor 26 corresponds to the fan-shaped notch of position sensor flag 27. Position sensor flag 27 passes between the light emitting part and the light receiving part. For example, when the light from the light emitting part of position sensor 26 to the light receiving part is not shut out by position sensor flag 27 in this manner, position sensor 26 becomes open and judges that cell 17 is positioned above the axis of shaft 12.

Figure 4B:
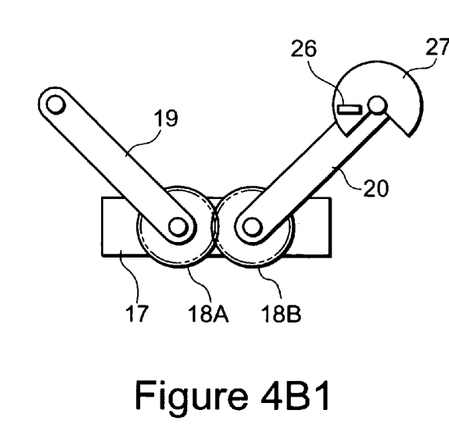
Figure 4B:
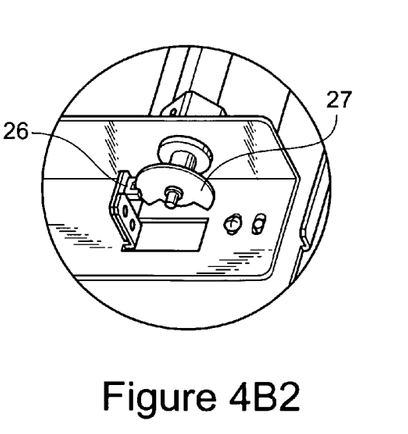

On the other hand, as shown in FIGS. 4B1 and 4B2, when the light from the light emitting part of position sensor 26 to the light receiving part is shut out by position sensor flag 27, position sensor 26 becomes closed and judges that cell 17 is positioned below the axis of shaft 12.

Pass-through port mechanism 4 is provided with a mechanism which detects whether arms 19, 20 are in a substantially horizontal position (e.g., the condition of FIG. 1).

Figure 5A:
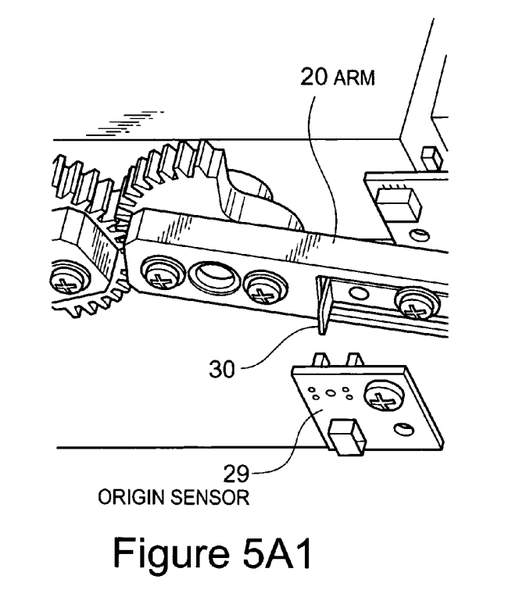

As shown in FIGS. 2A-2B, origin sensor 29 which detects whether arms 20 are in a substantially horizontal position is attached to the supporting plate 15. Origin sensor flag 30 monitored by origin sensor 29 is fixed to arms 20. The exemplary positional relationship between origin sensor 29 and origin sensor flag 30 is shown in FIGS. 5A1-5B2. FIG. 5A1 is an exemplary partial perspective view when origin sensor 29 is open, FIG. 5A2 is an exemplary side view when origin sensor 29 is open, FIG. 5B1 is an exemplary perspective view when origin sensor 29 is closed, and FIG. 5B2 is a side view when origin sensor 29 is closed.

Figure 5A:
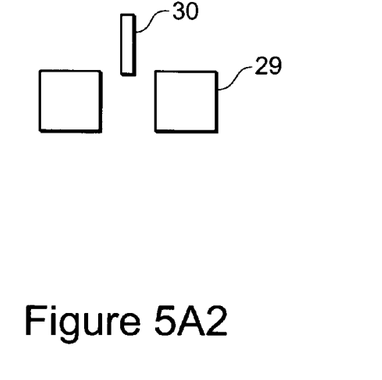

Origin sensor 29 may be an optical sensor including a light emitting part and a light receiving part, which are opposed to each other, and origin sensor flag 30 may be a plate perpendicularly fixed to the side surface of arms 20. Origin sensor flag 30 passes between the light emitting part and the light receiving part. For example, as shown in FIGS. 5A1 and 5A2, when arms 19, 20 are inclined upwardly, the light from the light emitting part of origin sensor 29 to the light receiving part is not shut out by origin sensor flag 30 and origin sensor 29 becomes open. Additionally, when arms 19, 20 are inclined downwardly, origin sensor 29 becomes open similarly. Therefore, when origin sensor 29 becomes open, the origin sensor judges that arms 19, 20 are inclined either upwardly or downwardly.

Figure 5B:
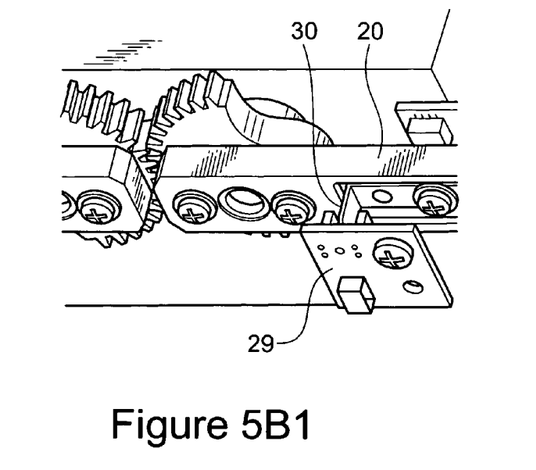
Figure 5B:
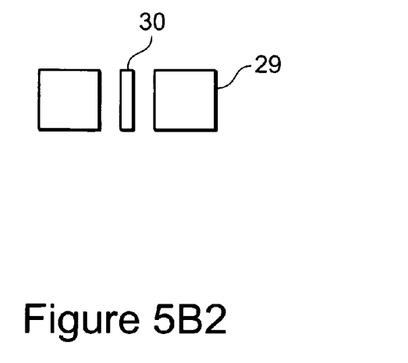

On the other hand, as shown in FIGS. 5B1 and 5B2, when arms 19, 20 are in a substantially horizontal position, the light from the light emitting part of origin sensor 29 to the light receiving part is shut out by origin sensor flag 30 and origin sensor 29 becomes closed. At this time, because origin sensor flag 30 is a plate having a wider area than that of the optical axis of origin sensor 29, there exists a range in which origin sensor 29 becomes closed. Thus, whether arms 19, 20 are in an accurately horizontal position cannot be judged only from detecting that origin sensor 29 has become closed. Therefore, in this exemplary embodiment, arms 19, 20 can be set in a horizontal position by finding beforehand to what extent arms 19, 20 move after the changeover of origin sensor 29 from OPEN to CLOSED so that arms 19, 20 assume a substantially horizontal position.

Figure 6:
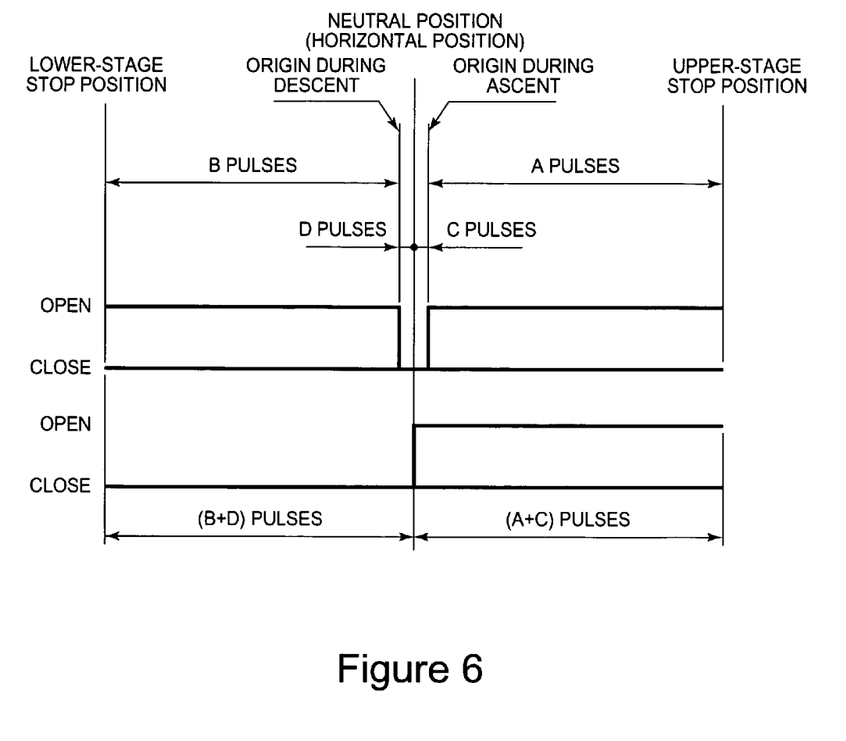
FIG. 6 is an exemplary timing chart of the position sensor and origin sensor, which are shown in FIGS. 2A and 2B, with respect to the arm position.

FIG. 6 is an exemplary timing chart of position sensor 26 and origin sensor 29 with respect to the arm position (cell position).

As shown in FIG. 6, the point at which arms 19, 20 assume a substantially horizontal position (a neutral position) is within the range in which origin sensor 29 becomes closed. When motor 25 is rotated counterclockwise (CCW) from the neutral position by a distance corresponding to a predetermined (e.g., any number according to the designer's requirement) number of pulses (i.e., C pulses), origin sensor 29 becomes open. This point is regarded as an "origin during ascent". The point reached when motor 25 is further rotated counterclockwise from this origin during ascent by a distance corresponding to a predetermined (e.g., any number according to the designer's requirement) number of pulses (i.e., A pulses) is a maximum ascent position of arms 19, 20. For example, this point is the stop point of cell 17 in the access space of the upper library device 2 and becomes the position in which the delivery and receiving of data cartridge 5 to and from accessor 8 is performed. Position sensor 26 becomes open while motor 25 is rotated counterclockwise from the neutral position by a distance corresponding to a predetermined (e.g., any number according to the designer's requirement) number of pulses (i.e., (A+C) pulses).

When motor 25 is clockwise (CW) rotated from the neutral position by a distance corresponding to a predetermined (e.g., any number according to the designer's requirement) number of pulses (i.e., D pulses), origin sensor 29 becomes open. This point is regarded as an "origin during descent". The point reached when motor 25 is further rotated clockwise from this origin during descent by a distance corresponding to a predetermined (e.g., any number according to the designer's requirement) number of pulses (i.e., B pulses) is a maximum descent position of arms 19, 20. For example, this point is the stop point of cell 17 in the access space of the lower library device 3 and becomes the position in which the delivery and receiving of data cartridge 5 to and from accessor 8 is performed. Position sensor 26 becomes closed while motor 25 is rotated clockwise from the neutral position by a distance corresponding to a predetermined (e.g., any number according to the designer's requirement) number of pulses (i.e., (B+D) pulses).

Hereinbelow, a method of finding an accurate horizontal position of arms 19, 20 is described. In the library system of this exemplary embodiment, immediately after turning on the power supply, an operation to set arms 19, 20 in a substantially horizontal position is performed. This operation is called the "initializing operation".

Figure 7:
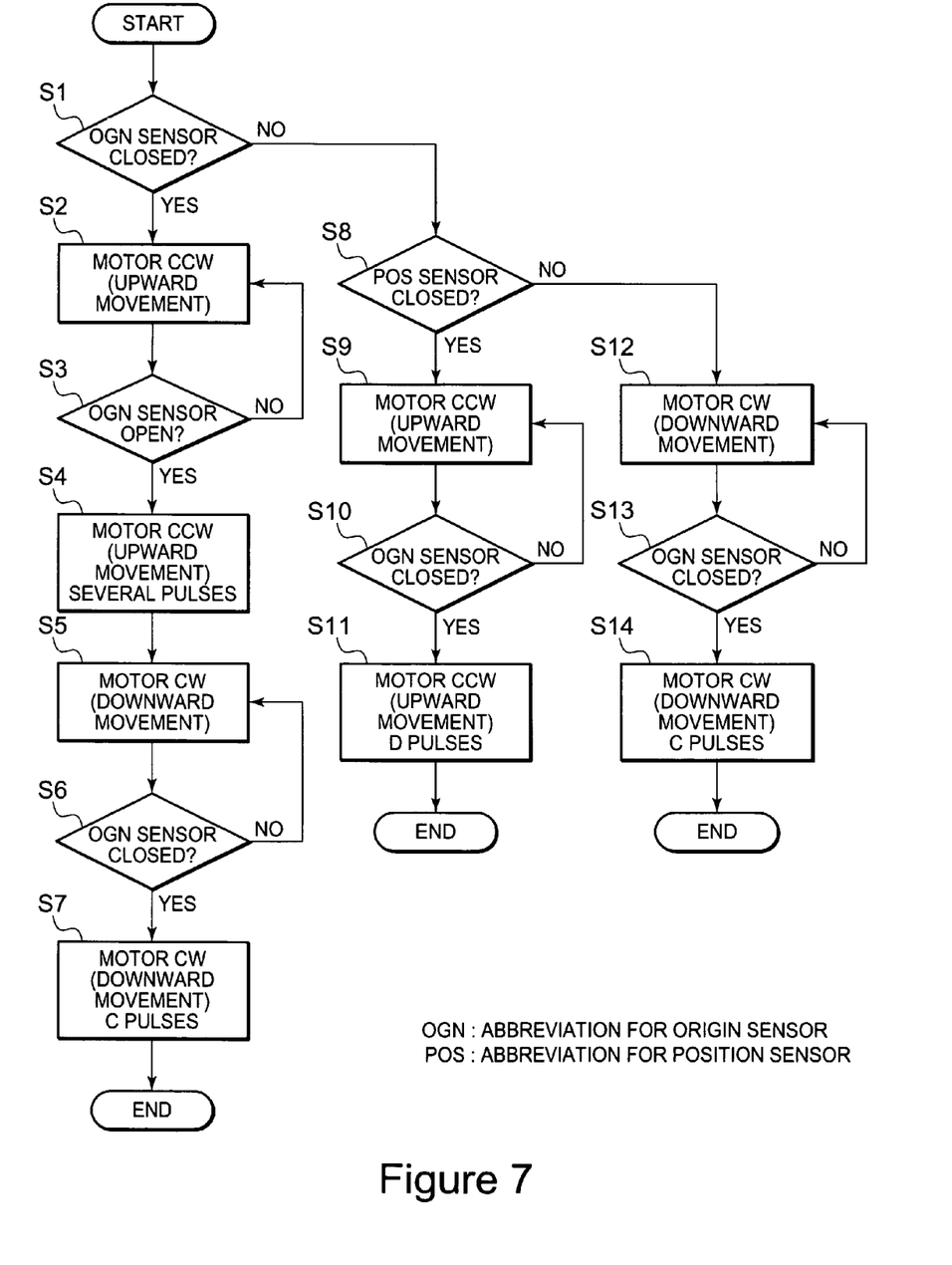
FIG. 7 is an exemplary flowchart showing the initializing operation of the arm shown in FIGS. 2A and 2B.

FIG. 7 is an exemplary flowchart which shows the above-described initializing operation.

As shown in FIG. 7, first, it is ascertained whether origin sensor 29 is closed (Step S1). When origin sensor 29 is closed (i.e., origin sensor 29 is judged to be closed), motor 25 rotates counterclockwise and arms 19, 20 move upwardly (Step S2). As a result, it is judged whether origin sensor 29 has become open (Step S3). When the origin sensor is judged to be open, motor 25 is rotated counterclockwise further by a certain number of pulses additional from the point of time at which origin sensor 29 has become open. Thereafter, motor 25 is reversely rotated and the point at which origin sensor 29 becomes closed is searched for (Steps S4 and S5). When origin sensor 29 has become closed (i.e., origin sensor 29 is judged to be closed), the point reached when the motor is rotated by a predetermined (e.g., any number according to the designer's requirement) number of pulses (i.e., C pulses) from this position is regarded as the origin point (Step S6). For example, the substantially horizontal position of arms 19, 20 is determined.

When it is judged in Step S1 that origin sensor 29 is open, cell 17 may deviate greatly either upwardly or downwardly. In this case, the present position of cell 17 can be detected from position sensor 26. Therefore, it is judged whether position sensor 26 is closed (Step S8). When position sensor 26 is judged to be closed (e.g., not open), as is apparent from FIG. 4B1, cell 17 is on the lower side. Therefore, motor 25 is rotated counterclockwise, whereby arms 19, 20 are moved upwardly and the point at which origin sensor 29 becomes closed is searched for (Steps S9 and S10).

When origin sensor 29 has become closed (i.e., origin sensor is judged to be closed), the point reached when the motor rotates by a predetermined (e.g., any number according to the designer's requirement) number of pulses (i.e., D pulses) from this position is regarded as the origin position (Step S11). Conversely, when position sensor 26 is judged to be open (e.g., not closed) at Step S8, as is apparent from FIG. 4A1, cell 17 is on the upper side. Therefore, motor 25 is rotated clockwise, whereby arms 19, 20 are moved downwardly and the point at which origin sensor 29 becomes closed is searched for (Steps S12 and S13). When origin sensor 29 has become closed (i.e., origin sensor 29 is judged to be closed), the point reached when the motor rotates by a predetermined (e.g., any number according to the designer's requirement) number of pulses (i.e., C pulses) from this point is regarded as the origin position (Step S14).

The substantially horizontal position of arms 19, 20 is determined as described above.

Next, a description will be given of a method of transferring data cartridge 5 between the upper and lower library devices 2, 3. FIGS. 8A-8D show, as an example, the operation of transferring data cartridge 5 of library device 3 of the lower stage by pass-through port mechanism 4 to library device 2 of the upper stage. FIG. 9 is an exemplary flowchart of the operation shown in FIGS. 8A-8D. Incidentally, in FIGS. 8A-8D, magazine 6 and drive 7 are omitted for ease of understanding.

Figure 8A:
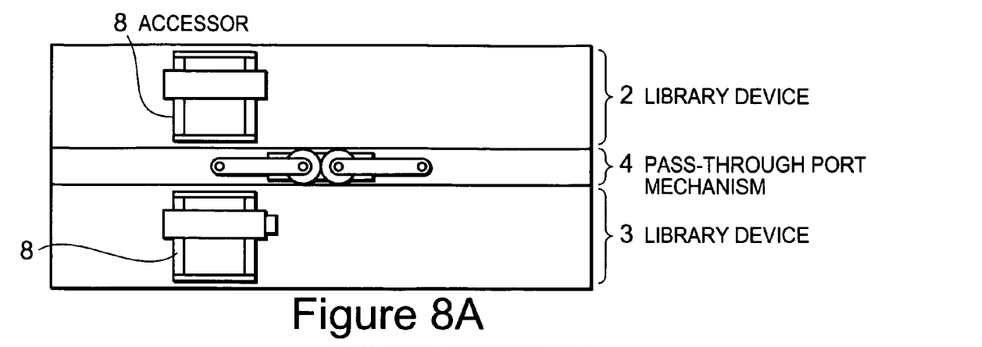
FIGS. 8A-8D are exemplary drawings showing the operation of transferring a data cartridge 5 of a library device 3 of the lower stage by the pass-through port mechanism 4 shown in FIG. 1 to a library device 2 of the upper stage.
Figure 8B:
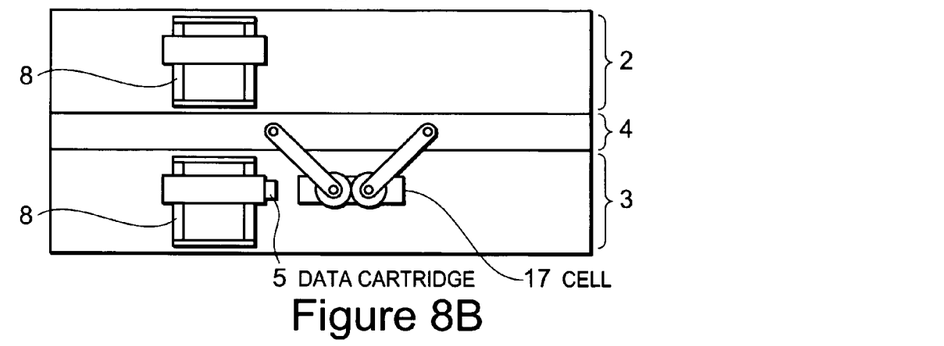
Figure 9:
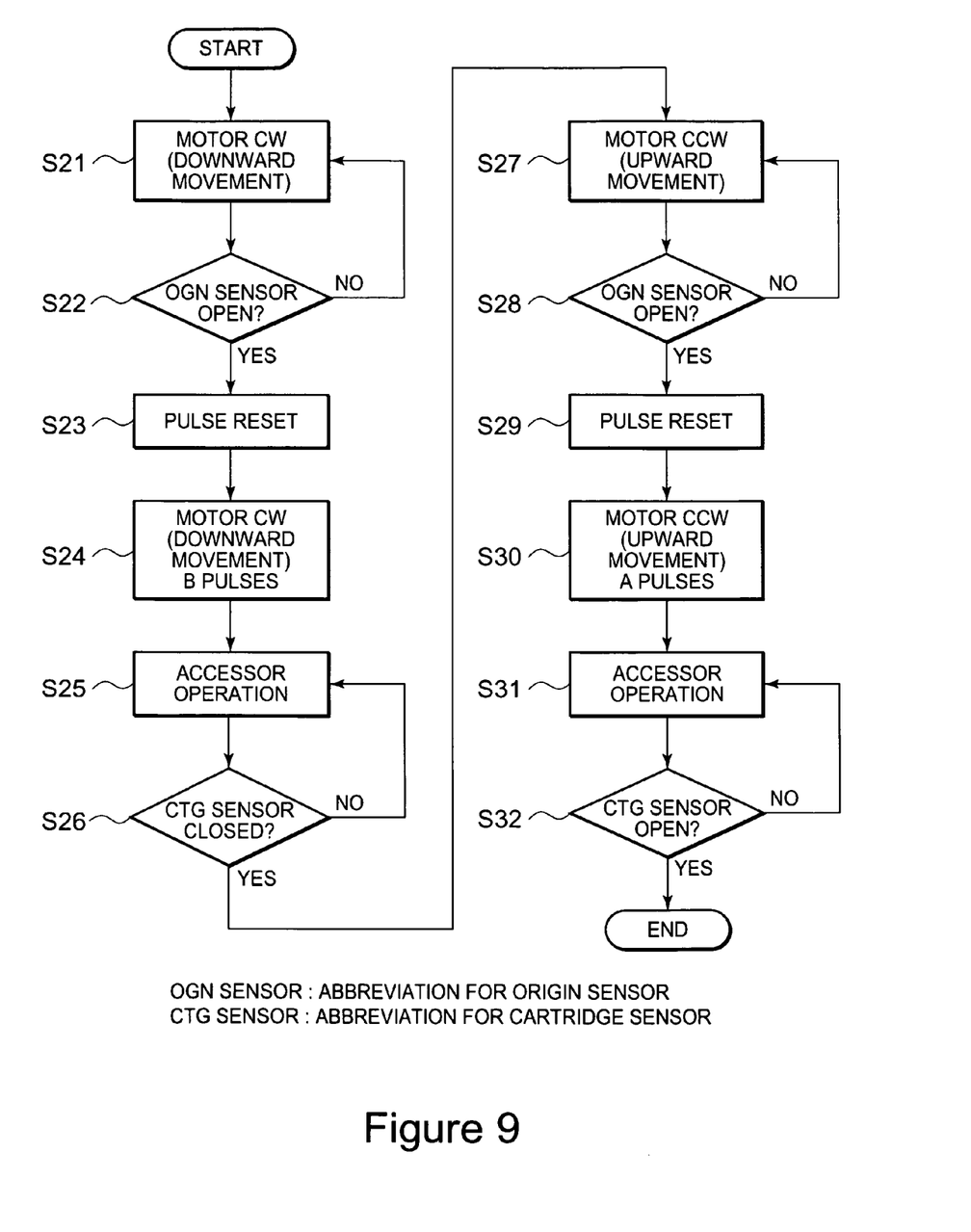
FIG. 9 is an exemplary flowchart of the operation shown in FIGS. 8A-8D.

As shown in FIG. 8A, after the completion of the initializing operation, motor 25 is rotated clockwise and cell 17 is moved to the lower side (Step S21 of FIG. 9). It is judged, whether during the movement to the lower side, origin sensor 29 has changed from CLOSED to OPEN (Step S22 of FIG. 9). At a time when origin sensor 29 has changed over to OPEN (e.g., a "Yes" in Step S22), the pulse Count of motor 25 is reset to zero (Step S23 of FIG. 9). When motor 25 is rotated by a predetermined (e.g., any number according to the designer's requirement) number of pulses (i.e., B pulses) from this point, as shown in FIG. 8B, cell 17 enters the access space of the lower library device 3 and obtains a height capable of receiving data cartridge 5 (Step S24 of FIG. 9). Cell 17 receives data cartridge 5 from accessor 8 of the lower library device 3 (Step S25 of FIG. 9). Whether the receiving of data cartridge 5 has been completed can be confirmed by cartridge sensor 28 (Step S26 of FIG. 9).

Figure 8C:
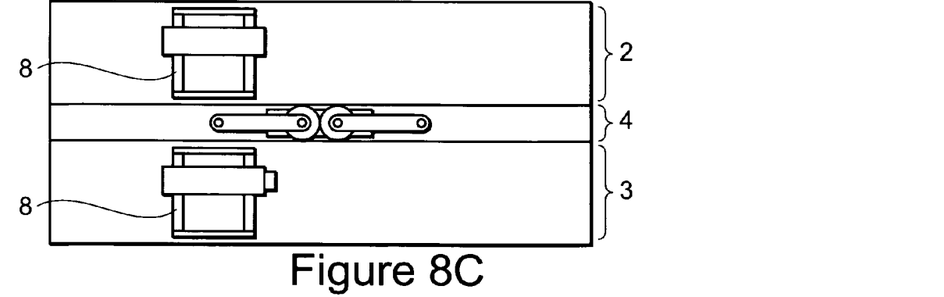
Figure 8D:
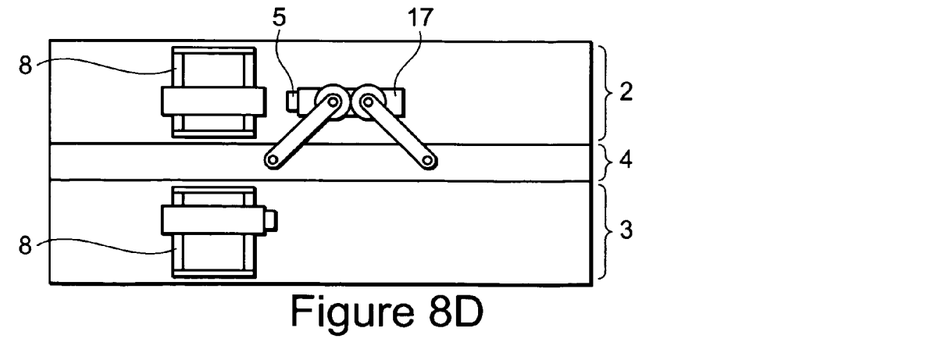

When it is judged by cartridge sensor 28 that the receiving of data cartridge 5 has been completed, motor 25 is rotated clockwise in order to deliver the received data cartridge 5 to the upper library device 2 and as shown in FIG. 8C, cell 17 is moved to the upper side (Step S27 of FIG. 9). At this time, origin sensor 29 changes from OPEN to CLOSED and further from CLOSED to OPEN. Also, it is judged whether origin sensor 29 has changed from CLOSED to OPEN (Step S28 of FIG. 9). At a time when origin sensor 29 has changed over to OPEN, the pulse count of motor 25 is reset to zero (Step S29 of FIG. 9). When motor 25 is rotated by a predetermined (e.g., any number according to the designer's requirement) number of pulses (i.e., A pulses) from this point, as shown in FIG. 8D, cell 17 enters the access space of the upper library device 2 and obtains a height capable of delivering data cartridge 5 (Step S30 of FIG. 9). Cell 17 has accessor 8 of lower library device 3 receive data cartridge 5 (Step S31 of FIG. 9). Whether the receiving of data cartridge 5 has been completed can be confirmed by cartridge sensor 28 (Step S32 of FIG. 9).

As described above, according to the present invention, the data cartridge 5 can be transferred between the library devices 2, 3 without increasing the size of the library system 1. Also, simply by disposing the elevator (i.e., pass-through port mechanism 4) between the library devices, the library devices can be easily expanded.

For example, the elevator (i.e., pass-through port mechanism 4) can be disposed without increasing the area of the library devices 2, 3 in a top view. This is because the elevator (i.e., pass-through port mechanism 4) is positioned between library device 2 and library device 3, for example.

In another exemplary aspect, an area of movement of accessor 8 and cell 17 can overlap. This is because the elevator (i.e., pass-through port mechanism 4) includes no stationary structure in the overlapped area and/or cell 17 that stores a data storage medium (i.e., data cartridge 5) moves between library device 2 and second library device 3, for example.

In another aspect, pass-through port mechanism 4 of this exemplary embodiment imay be a mechanism which lifts and lowers cell 17 capable of storing data cartridge 5 by the oscillation of arms 19, 20. For this reason, when it is unnecessary to move data cartridge 5 between library devices 2, 3, by keeping arms 19, 20 in a substantially horizontal condition, cell 17 is housed in the installation space of the cartridge transfer mechanism itself between library devices 2, 3. When it becomes necessary to move data cartridge 5 between library devices 2, 3, by oscillating arms 19, 20 and causing cell 17 to enter the access space of library devices 2, 3, the delivery and receiving of the data cartridge 8 between cell 17 and accessor 8, can be performed. For example, because it is unnecessary to provide an elevator mechanism in part of each of library devices 2, 3 as in conventional techniques, the number of cartridges is not limited and also, the size of each of library devices 2, 3 does not become large. Although pass-through port mechanism 4 is disposed between library devices 2, 3 which are positioned adjacent (e.g., vertically laid, superposed) to each other, pass-through port mechanism 4 may be a mechanism which has a relatively small height (e.g., is thin in the height direction) and hence also in this respect, it is unnecessary to make the size of the system large.

While this invention has been described with reference to exemplary embodiments, this description is not intended as limiting. Various modifications of the illustrative embodiments, as well as other embodiments of the invention, will be apparent to persons skilled in the art upon taking description as a whole. It is, therefore, contemplated that the appended claims will cover any such modifications or exemplary embodiments as fall within the true scope of the invention.

Further, the inventor's intent is to encompass all equivalents of all the elements of the claimed invention even if the claims are amended during prosecution.

This application is based on Japanese Patent Application No. 2004-313864 filed on Oct. 28, 2004 and including specification, claims, drawings and summary. The disclosure of the above Japanese Patent Application is incorporated herein by reference in its entirety.

What is claimed is:

1. A library system, comprising:
   a first library device that includes a first drive for reading information from a data storage medium or writing information to said data storage medium and a first storage cell for storing said data storage medium and a first elevator for transporting said data storage medium;
   a second library device that includes a second drive for reading information from said data storage medium or writing information to said data storage medium and a second storage cell for storing said data storage medium, and a second elevator for transporting said data storage medium; and
   a pass-through port mechanism located between said first library device and said second library device that includes a cell for transporting said data storage medium between said first elevator and said second elevator,
   wherein a space is provided between said first library device and said second library device through which said pass-through port mechanism transports said data storage medium, and in which said pass-through port mechanism is disposed,
   wherein said first elevator transports said data storage medium between said first drive and said first storage cell,
   wherein said cell stores said data storage medium, said cell being movable between said first library device and said second library device, and
   wherein said cell comprises:
      an arm that is provided with said cell, said arm rotating about an axis;
      a supporting plate that includes said axis; and
      a second arm that is provided with said cell, said second arm slides along and rotates about an elongated hole provided with said supporting plate.

2. The library system according to claim 1, said cell further comprising:
   a first gear that is fixed to said first arm and rotatably fixed to said cell; and
   a second gear that is fixed to said second arm and rotatably fixed to said cell.

3. A library system, comprising:
   a first library device that includes a first drive for reading information from a data storage medium or writing information to said data storage medium and a first storage cell for storing said data storage medium and a first elevator for transporting said data storage medium;
   a second library device that includes a second drive for reading information from said data storage medium or writing information to said data storage medium and a second storage cell for storing said data storage medium, and a second elevator for transporting said data Storage medium; and
   a pass-through port mechanism located between said first library device and said second library device that includes a cell for transporting said data storage medium between said first elevator and said second elevator,
   wherein a space is provided between said first library device and said second library device through which said pass-through port mechanism transports said data storage medium, and in which said pass-through port mechanism is disposed,
   wherein said first elevator transports said data storage medium between said first drive and said first storage cell,
   wherein said cell stores said data storage medium, said cell being movable between said first library device and said second library device, and
   wherein said cell comprises:
      an arm that is provided with said cell, said arm rotating about an axis;
      a supporting plate that includes said axis; and
      a position sensor that detects whether said cell is positioned above or below said axis.

4. The library system according to claim 3, said position sensor comprising:
   an optical sensor that includes a light emitting part and a light receiving part; and
   a position sensor flag that is partially notched and journalled to said axis, said position sensor flag passing between said light emitting part and said light receiving part,
   wherein, when a light from said light emitting part of said position sensor to said light receiving part is not shut out by said position sensor flag, it is judged that a position of said cell is positioned above said axis, and
   wherein, when said light from said light emitting part of said position sensor to said light receiving part is shut out by said position sensor flag, it is judged that a position of said cell is positioned below said axis.

5. The library system according to claim 4, said cell further comprising:
   an origin sensor that detects whether said arm is in a substantially horizontal position.

6. The library system according to claim 5, said origin sensor comprising:
   a second optical sensor that includes a second light emitting part and a second light receiving part; and
   an origin sensor flag that comprises a plate perpendicularly fixed to a side surface of said arm, said origin sensor flag passing between said second light emitting part and said second light receiving part,
   wherein, when a light from said light emitting part of said second position sensor to said second light receiving part is not shut out by said origin sensor flag, it is judged that said arm is inclined, and
   wherein, when a light from said light emitting part of said second position sensor to said second light receiving part is shut out by said origin sensor flag, it is judged that said arm is in a substantially horizontal position.

* * * * *